United States Patent
Hayakawa et al.

(10) Patent No.: US 9,488,233 B2
(45) Date of Patent: Nov. 8, 2016

(54) CONTROL DEVICE FOR ELECTROMAGNETIC CLUTCH

(71) Applicant: JTEKT CORPORATION, Osaka-shi, Osaka (JP)

(72) Inventors: Masahiro Hayakawa, Okazaki (JP); Tsutomu Matsumoto, Anjo (JP)

(73) Assignee: JTEKT CORPORATION, Osaka (JP)

( * ) Notice: Subject to any disclaimer, the term of this patent is extended or adjusted under 35 U.S.C. 154(b) by 5 days.

(21) Appl. No.: 14/640,475

(22) Filed: Mar. 6, 2015

(65) Prior Publication Data

US 2015/0260239 A1    Sep. 17, 2015

(30) Foreign Application Priority Data

Mar. 12, 2014  (JP) .................. 2014-048810

(51) Int. Cl.
| | |
|---|---|
| *F16D 19/00* | (2006.01) |
| *F16D 27/118* | (2006.01) |
| *F16D 27/11* | (2006.01) |
| *H01F 7/18* | (2006.01) |
| *F16D 27/00* | (2006.01) |

(52) U.S. Cl.
CPC ............ *F16D 27/118* (2013.01); *F16D 27/11* (2013.01); *F16D 2027/002* (2013.01); *H01F 7/18* (2013.01)

(58) Field of Classification Search
CPC ............... F16D 27/118; F16D 27/11; F16D 2027/022; H01F 7/18
See application file for complete search history.

(56) References Cited

U.S. PATENT DOCUMENTS

| | | | | |
|---|---|---|---|---|
| 1,671,057 A | * | 5/1928 | Brainard ................. | F16D 27/06 192/103 R |
| 3,073,422 A | * | 1/1963 | Baumann ................ | F16D 27/02 192/3.56 |
| 3,229,796 A | * | 1/1966 | Worst .................... | F16D 27/112 192/104 R |
| 3,704,769 A | * | 12/1972 | Spencer ................. | F16D 27/06 123/198 R |
| 3,704,770 A | * | 12/1972 | Spencer ................. | F16D 27/06 188/164 |
| 4,550,816 A | * | 11/1985 | Sakakiyama ........... | F16D 37/02 192/21.5 |
| 4,730,711 A | * | 3/1988 | Sakakiyama ........... | F16D 37/02 192/3.56 |

FOREIGN PATENT DOCUMENTS

| | | |
|---|---|---|
| JP | 2004-092691 A | 3/2004 |
| JP | 2009-138798 A | 6/2009 |

* cited by examiner

*Primary Examiner* — David J Hlavka
(74) *Attorney, Agent, or Firm* — Oliff PLC

(57) ABSTRACT

A control device for an electromagnetic clutch includes: a first switch that is connected to one end of an electromagnetic coil forming the electromagnetic clutch; a second switch that is connected to the other end of the electromagnetic coil; and a microcomputer that controls an on/off state of both switches. The control device further includes: a first diode having its anode terminal connected between the electromagnetic coil and the first switch and its cathode terminal connected between the second switch and an in-vehicle power source; and a second diode having its anode terminal connected to the ground and its cathode terminal connected between the electromagnetic coil and the second switch. The microcomputer stops power supply to the electromagnetic coil by turning off both switches.

4 Claims, 15 Drawing Sheets

CONTROL DEVICE FOR ELECTROMAGNETIC CLUTCH

INCORPORATION BY REFERENCE

The disclosure of Japanese Patent Application No. 2014-048810 filed on Mar. 12, 2014 including the specification, drawings and abstract, is incorporated herein by reference in its entirety.

BACKGROUND OF THE INVENTION

1. Field of the Invention

The invention relates to control devices for electromagnetic clutches.

2. Description of the Related Art

Conventionally, electromagnetic clutches are widely known in the art that are capable of permitting and cutting off torque transmission between a first rotary member and a second rotary member by controlling current application to an electromagnetic coil. See, e.g., Japanese Patent Application Publication No. 2009-138798 (JP 2009-138798 A). Even if power supply to the electromagnetic coil is stopped in order to cut off torque transmission between the first and second rotary members, a current flowing in the electromagnetic coil does not immediately become zero due to a back electromotive force that is generated due to electromagnetic induction so as to oppose a change in the amount of current flowing in the electromagnetic coil. This causes delay in response of the electromagnetic clutch.

As a solution to this problem, Japanese Patent Application Publication No. 2004-92691 (JP 2004-92691 A), for example, proposes a control device for an electromagnetic clutch in which a load such as a resistor is connected in parallel to an electromagnetic coil so that a current due to a back electromotive force flows in the load when power supply to the electromagnetic coil is stopped. The back electromotive force that is generated in the electromagnetic coil when power supply to the electromagnetic coil is stopped is consumed by conversion to heat in the load. Accordingly, a current flowing in the electromagnetic coil can quickly become zero, and responsiveness of the electromagnetic clutch can be improved.

In recent years, higher responsiveness has been required for the electromagnetic clutches, and the required level of responsiveness has not been achieved even with such a configuration as described in JP 2004-92691 A. Accordingly, there is a demand for a new technique capable of implementing higher responsiveness.

SUMMARY OF THE INVENTION

It is an object of the invention to provide a control device for an electromagnetic clutch that is capable of implementing high responsiveness.

According to an aspect of the invention, a control device for an electromagnetic clutch that permits and cuts off torque transmission between a first rotary member and a second rotary member includes: a first switch that is connected to one end of an electromagnetic coil forming the electromagnetic clutch; a second switch that is connected to the other end of the electromagnetic coil; a first diode that allows a current to flow from the one end of the electromagnetic coil to a power supply line connecting the second switch and a power source; a second diode that allows a current to flow from a reference potential point to the other end of the electromagnetic coil; and a control circuit that controls an on/off state of the first and second switches. The control circuit stops power supply to the electromagnetic coil by turning off both the first and second switches.

According to the above configuration, a back electromotive force that is generated when power supply to the electromagnetic coil is stopped is consumed as a current flows from the second diode to the power source via the electromagnetic coil and the first diode. That is, the back electromotive force of the electromagnetic coil is consumed by regeneration by the power source. Accordingly, the current flowing in the electromagnetic coil can quickly become zero, and responsiveness of the electromagnetic clutch can be improved as compared to the case where the back electromotive force of the electromagnetic coil is consumed by conversion to heat using a load such as a resistor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the invention will be described below with reference to the accompanying drawings.

Figure 1:
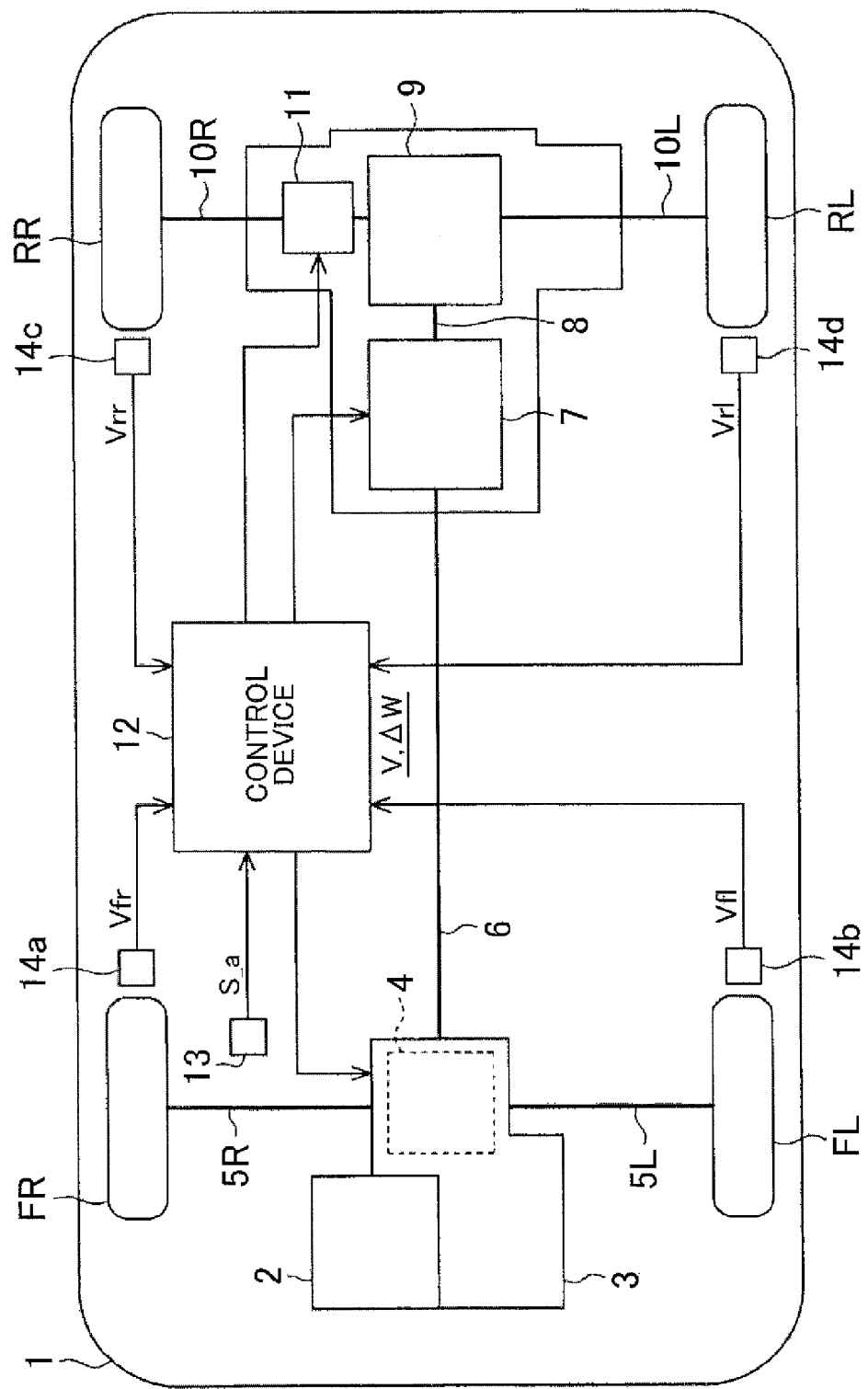
FIG. 1 is a schematic configuration diagram of a vehicle (four-wheel drive vehicle) including an electromagnetic clutch according to a first embodiment.

As shown in FIG. 1, a vehicle 1 is a four-wheel drive vehicle based on a front-wheel-drive vehicle. An engine 2 serving as a driving source is mounted on the front part (the left side in FIG. 1) of the vehicle 1. A transaxle 3 is attached to the engine 2. The transaxle 3 includes a clutch mechanism 4 in addition to a transmission, a front differential, a transfer case, etc. (which are not shown). Front wheels FR, FL are always coupled to the transaxle 3 via a pair of right and left front axles 5R, 5L. A propeller shaft 6 is coupled to the transaxle 3 via the clutch mechanism 4.

A pinion shaft (drive pinion shaft) 8 is coupled to the propeller shaft 6 via a torque coupling 7, and a rear differential 9 is coupled to the pinion shaft 8. Rear wheels RR, RL are coupled to the rear differential 9 via a pair of right and left rear axles 10R, 10L. A well-known bevel gear differential is used as the rear differential 9 of the present embodiment. An electromagnetic clutch 11 is disposed between the rear differential 9 and the right rear axle 10R.

The clutch mechanism 4 is capable of permitting and cutting off torque transmission between an output shaft (not shown) of the transaxle 3 and the propeller shaft 6. The torque coupling 7 is configured so that a friction engagement force between clutch plates (not shown) provided on the propeller shaft 6 side and on the pinion shaft 8 side changes according to the amount of current that is applied to an electromagnetic coil (not shown) of the torque coupling 7. The torque coupling 7 transmits torque based on the friction engagement force between the clutch plates from the propeller shaft 6 on the input side to the pinion shaft 8 on the output side. That is, the torque coupling 7 is capable of changing torque (torque transmission capacity) that can be transmitted to the pinion shaft 8 (the rear wheels RR, RL). The electromagnetic clutch 11 is capable of permitting and cutting off torque transmission between a side gear (not shown) of the rear differential 9 and the rear axle 10R.

A control device 12 that controls operation of the clutch mechanism 4, the torque coupling 7, and the electromagnetic clutch 11 is connected to the clutch mechanism 4, the torque coupling 7, and the electromagnetic clutch 11. The clutch mechanism 4 of the present embodiment is connected to the control device 12 via a host electronic control unit (ECU). An accelerator operation amount sensor 13 and wheel speed sensors 14a to 14d are connected to the control device 12. The control device 12 calculates a vehicle speed V and a wheel speed difference ΔW between the front wheels FR, FL and the rear wheels RR, RL based on wheel speeds Vfr, Vfl, Vrr, Vrl that are detected by the wheel speed sensors 14a to 14d. The control device 12 controls operation of the clutch mechanism 4, the torque coupling 7, and the electromagnetic clutch 11 based on the vehicle speed V, the wheel speed difference ΔW, and an accelerator operation amount signal S_a from the accelerator operation amount sensor 13.

Specifically, the control device 12 computes a control target value of the torque transmission capacity (target torque) of the torque coupling 7 based on the vehicle speed V, the wheel speed difference ΔW, and the accelerator operation amount signal Sa. If the target torque is zero, the control device 12 operates so as to switch the vehicle 1 into a two-wheel drive mode. That is, the control device 12 brings the clutch mechanism 4 into a disengaged state, namely the state where the clutch mechanism 4 cannot transmit torque, to cut off torque transmission from the engine 2 to the propeller shaft 6, and also brings the electromagnetic clutch 11 into a disengaged state to cut off torque transmission from the side gear to the rear axle 10R. At this time, the control device 12 also stops power supply to the torque coupling 7.

If the target torque is larger than zero, the control device 12 operates so as to switch the vehicle 1 into a four-wheel drive mode. That is, the control device 12 brings the clutch mechanism 4 into an engaged state, namely the state where the clutch mechanism 4 can transmit torque, to permit torque transmission from the engine 2 to the propeller shaft 6, and also brings the electromagnetic clutch 11 into an engaged state to permit torque transmission from the side gear to the rear axle 10R. At this time, the control device 12 controls operation of the torque coupling 7 by power supply to the electromagnetic coil so that the torque transmission capacity becomes equal to the target torque.

Accordingly, in the two-wheel drive mode, the torque of the engine 2 is transmitted only to the front wheels FR, FL through the transaxle 3 and the front axles 5R, 5L. In contrast, in the four-wheel drive mode, the torque of the engine 2 is transmitted to the front wheels FR, FL through the transaxle 3 and the front axles 5R, 5L, and is also transmitted to the rear wheels RR, RL through the propeller shaft 6, the pinion shaft 8, the rear differential 9, and the rear axles 10R, 10L as necessary. That is, in the present embodiment, the front wheels FR, FL function as main drive wheels to which torque is always transmitted, and the rear wheels RR, RL function as auxiliary drive wheels to which torque is transmitted as necessary.

The configuration of the electromagnetic clutch will be described in detail below.

Figure 2:
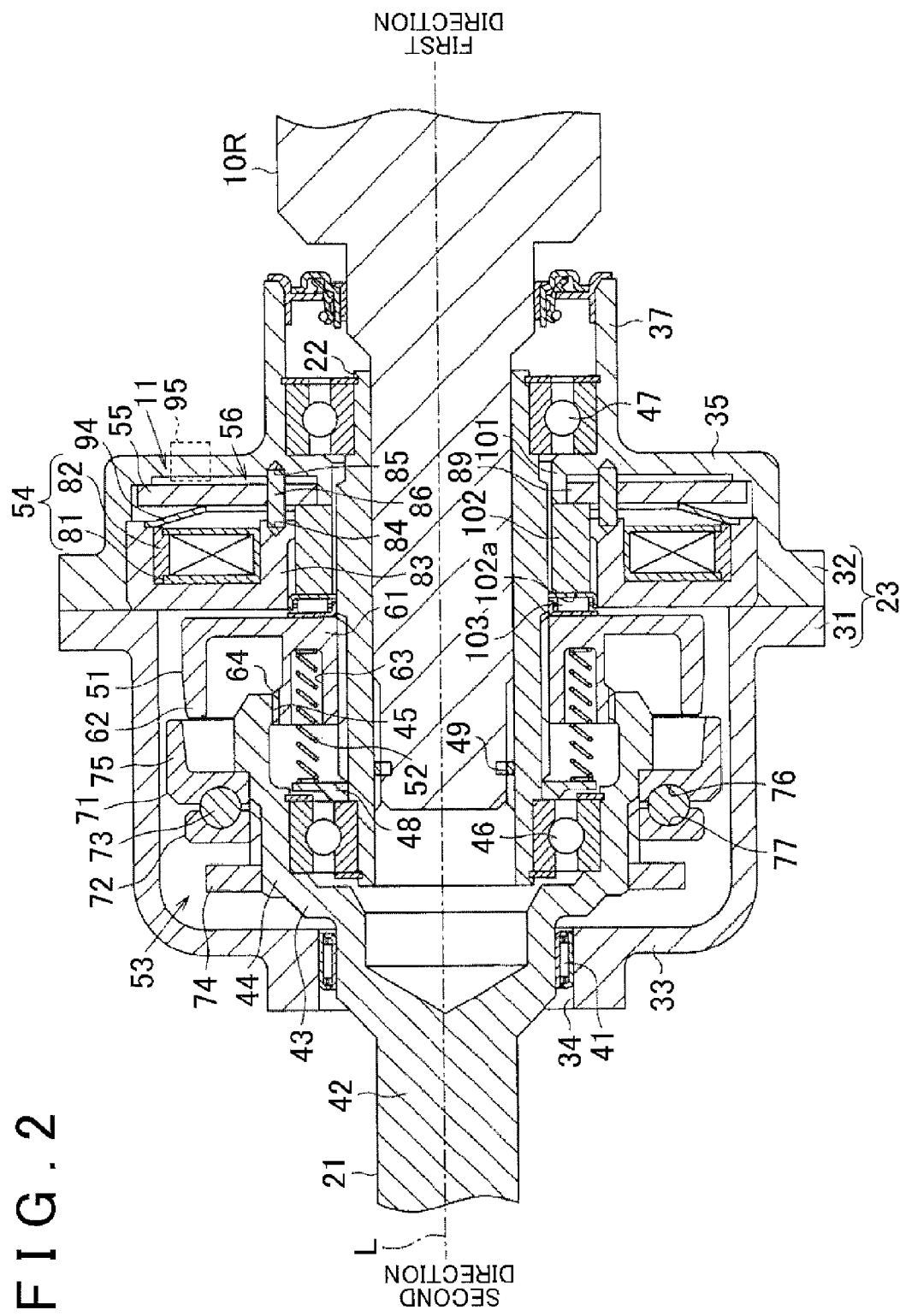
FIG. 2 is a sectional view of the electromagnetic clutch according to the first embodiment.

As shown in FIG. 2, the electromagnetic clutch 11 is capable of permitting and cutting off torque transmission between a rod-shaped first rotary member 21 and a cylindrical second rotary member 22. The first rotary member 21 is coupled to the side gear of the rear differential 9 so as to be rotatable together therewith. The second rotary member 22 is coupled to the rear axle 10R so as to be rotatable together therewith. The first rotary member 21 and the second rotary member 22 are supported on the same axis L in a housing 23 so as to be rotatable relative to each other. In the following description, the "first direction side" refers to the rear axle 10R side (the right side in FIG. 2) on the axis L, and the "second direction side" refers to the rear differential 9 side (the left side in FIG. 2) on the axis L.

The housing 23 includes first and second housings 31, 32 having the shape of a bottomed cylinder. A bottom 33 of the first housing 31 has a through hole 34 extending therethrough in the axial direction. A bottom 35 of the second housing 32 has a through hole 36 extending therethrough in the axial direction, and an extended cylindrical portion 37 is extended from the outer bottom surface of the bottom 35 toward the first direction side. The housing 23 is formed by coupling the opening ends of the first and second housings 31, 32.

The first rotary member 21 is supported so as to be rotatable relative to the first housing 31 via a rolling bearing 41 provided in the through hole 34 of the first housing 31. The first rotary member 21 has a round rod-shaped shaft portion 42, an extended portion 43, and a cylindrical portion 44. The extended portion 43 is extended radially outward from the first direction side (the second rotary member 22 side) end of the shaft portion 42. The cylindrical portion 44 is extended in the axial direction from the radially outer end of the extended portion 43 toward the first direction side. A first spline fitting portion 45 as a first meshing portion is formed on the opening end of the inner peripheral surface of the cylindrical portion 44.

The second rotary member 22 is supported so as to be rotatable relative to the first rotary member 21 and the second housing 32 via rolling bearings 46, 47. The rolling bearing 46 is provided on the inner periphery of the cylindrical portion 44 of the first rotary member 21, and the rolling bearing 47 is provided on the inner periphery of the extended cylindrical portion 37 of the second housing 32. An annular fixed member 48 is fixed to the outer periphery of the second rotary member 22 so as to adjoin the first direction side of the rolling bearing 46. The second direction side end of the rear axle 10R is spline-fitted in the second rotary member 22. The second rotary member 22 is thus coupled to the rear axle 10R so as to be rotatable therewith. A snap ring 49 is interposed between the second rotary member 22 and the rear axle 10R to restrict relative axial movement between the second rotary member 22 and the rear axle 10R.

The electromagnetic clutch 11 includes a meshing member 51, a biasing member 52, and a cam mechanism 53. The meshing member 51 is coupled to the second rotary member 22 so as to be movable in the axial direction relative to the second rotary member 22 and so as not to be rotatable relative to the second rotary member 22. The biasing member 52 biases the meshing member 51 in the axial direction. The cam mechanism 53 together with the meshing member 51 synchronizes (matches) rotation of the first rotary member 21 with rotation of the second rotary member 22. The electromagnetic clutch 11 further includes an electromagnetic coil 54, an armature 55, and a pressing mechanism 56. The electromagnetic coil 54 generates a magnetic force when a current is applied thereto. The armature 55 is moved in the axial direction by the magnetic force of the electromagnetic coil 54. With the axial movement of the armature 55, the pressing mechanism 56 presses the meshing member 51 against the biasing force of the biasing member 52 to move the meshing member 51 in the axial direction.

The meshing member 51 has a cylindrical portion 61 and a friction engagement portion 62 having the shape of a bottomed cylinder. The friction engagement portion 62 is extended radially outward from the first direction side end of the cylindrical portion 61 and then extended toward the second direction side. The cylindrical part of the friction engagement portion 62 is tapered toward the second direction side. Namely, the outer peripheral surface of the cylindrical part of the friction engagement portion 62 is tilted radially inward so that the thickness (length in the radial direction) of the friction engagement portion 62 gradually decreases toward the second direction side. The cylindrical portion 61 of the meshing member 51 is spline-fitted on the second rotary member 22. The meshing member 51 is thus coupled to the second rotary member 22 so as to be movable in the axial direction relative to the second rotary member 22 and so as not to be rotatable relative to the second rotary member 22. An accommodating hole 63 extending in the axial direction is formed in the second direction side end face of the cylindrical portion 61. A second spline fitting portion 64 serving as a second meshing portion capable of meshing with the first spline fitting portion 45 is formed on the outer periphery of the second direction side end of the cylindrical portion 61.

The second spline fitting portion 64 is formed in such a range in the axial direction that the second spline fitting portion 64 meshes with the first spline fitting portion 45 when the meshing member 51 is located on the first direction side and that the second spline fitting portion 64 is disengaged from the first spline fitting portion 45 as the meshing member 51 moves toward the second direction side. When the first and second spline fitting portions 45, 64 mesh with each other, the electromagnetic clutch 11 is engaged so that torque can be transmitted between the first and second rotary members 21, 22. When the first and second spline fitting portions 45, 64 are disengaged from each other, the electromagnetic clutch 11 is disengaged so that torque cannot be transmitted between the first and second rotary members 21, 22.

A spring member such as a coil spring is used as the biasing member 52. The first direction side end of the biasing member 52 is coupled to the bottom surface of the accommodating hole 63 of the meshing member 51, and the second direction side end of the biasing member 52 is coupled to a side surface of the fixed member 48. The biasing member 52 is thus disposed in an axially compressed state between the fixed member 48 and the meshing member 51. The biasing member 52 therefore biases the meshing member 51 toward the first direction side, namely in such a direction that the second spline fitting portion 64 meshes with the first spline fitting portion 45.

The cam mechanism 53 includes annular first and second cam members 71, 72, a plurality of balls (cam followers) 73 interposed between the first and second cam members 71, 72, and an annular stopper 74 that restricts axial movement of the second cam member 72.

The first cam member 71 is fitted on the cylindrical portion 44 of the first rotary member 21 so as to be rotatable relative to the cylindrical portion 44 of the first rotary member 21. The first cam member 71 has a cylindrical friction engagement portion 75 extended from the radially outer end of the first cam member 71 toward the first direction side. The friction engagement portion 75 is tapered toward the first direction side. Namely, the inner peripheral surface of the friction engagement portion 75 is tilted radially outward so that the thickness of the friction engagement portion 75 gradually decreases toward the first direction side. The friction engagement portion 62 of the meshing member 51 thus strongly frictionally engages with the friction engagement portion 75 of the first cam member 71 as the meshing member 51 moves toward the second direction side. The second cam member 72 is spline-fitted on the cylindrical portion 44. The second cam member 72 is thus coupled to the first rotary member 21 so as to be movable in the axial direction relative to the first rotary member 21 and so as not to be rotatable relative to the first rotary member 21. The stopper 74 is fixed to the second direction side end of the outer periphery of the cylindrical portion 44.

A plurality of cam grooves 76, 77 tilted with respect to the circumferential direction are formed at regular angular intervals on the opposing surfaces of the first and second cam members 71, 72. Each of the cam grooves 76, 77 of the present embodiment has a U-shaped section, and is formed so that its depth increases from the center in the circumferential direction toward both ends in the circumferential direction. The balls 73 are disposed in the opposing cam grooves 76, 77 and held between the first and second cam members 71, 72.

When the friction engagement portions 62, 75 are not in friction engagement with each other, the balls 73 are located in the centers in the circumferential direction of the cam grooves 76, 77 in this cam mechanism 53, and no axial pressing force is generated in the first and second cam members 71, 72. If the meshing member 51 moves toward the second direction side so that the friction engagement portions 62, 75 frictionally engage with each other and the first and second cam members 71, 72 rotate relative to each other, the balls 73 move in the circumferential direction within the cam grooves 76, 77, and the second cam member 72 is separated from the first cam member 71 and pressed against the stopper 74. An axial pressing force is thus generated between the first and second cam members 71, 72, which restricts rotation of the first cam member 71 relative to the first rotary member 21. Torque is thus transmitted from the first cam member 71 to the meshing member 51, whereby the rotational speed of the first rotary member 21 becomes closer to that of the second rotary member 22. That is, rotation of the first rotary member 21 is synchronized with that of the second rotary member 22.

The electromagnetic coil 54 is formed by winding around a resin bobbin 81 a wire 82 in which a current supplied from the control device 12 flows. The electromagnetic coil 54 is held by an annular yoke 83 made of a ferromagnetic material such as iron. The yoke 83 is supported by the inner periphery of the second housing 32. Fitting holes 84 opening toward the first direction side are formed in the yoke 83 at intervals in the circumferential direction. A plurality of fitting holes 85 opening toward the second direction side are formed in the second housing 32 at positions facing the respective fitting holes 84 in the axial direction. The ends of each columnar pin 86 that is disposed parallel to the axis L are fitted in the fitting holes 84, 85.

Figure 3:
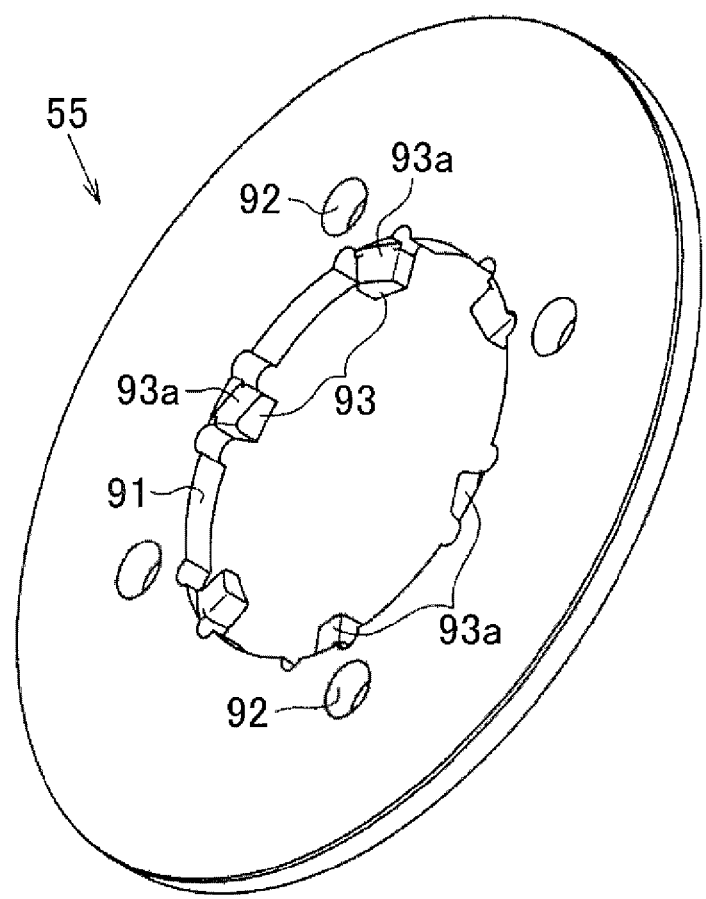
FIG. 3 is a perspective view of an armature according to the first embodiment.

As shown in FIGS. 2 and 3, the armature 55 is formed in the shape of a disc. The armature 55 has a through hole 91 formed in its center, and insertion holes 92 formed at intervals in the circumferential direction. The second rotary member 22 is inserted through the through hole 91, and the pins 86 are inserted through the respective insertion holes 92. The armature 55 further has a plurality of (six in the present embodiment) pressing protrusions 93 protruding radially inward from the inner peripheral surface of the through hole 91. Facing surfaces 93a of the pressing protrusions 93 which face the axial end faces of engaged portions of a piston 102 described below are tilted surfaces tilted with respect to the thickness direction of the armature 55 (the direction parallel to the axis L).

The armature 55 is biased in such a direction that the armature 55 is separated from the yoke 83 by a coned disc spring 94 placed between the armature 55 and the yoke 83. When no current is applied to the electromagnetic coil 54, the armature 55 contacts the bottom 35 of the second housing 32 by the biasing force of the coned disc spring 94. When a current is applied to the electromagnetic coil 54, the armature 55 contacts the yoke 83 against the biasing force of the coned disc spring 94 due to the magnetic force that is generated by the electromagnetic coil 54. Rotation of the armature 55 relative to the second housing 32 and the yoke 83 is restricted by the pins 86 inserted through the insertion holes 92. The armature 55 is thus guided by the pins 86 to move between a first position where the armature 55 contacts the bottom 35 of the second housing 32 and a second position where the armature 55 contacts the yoke 83. The second housing 32 is provided with a stroke sensor 95 that detects the position of the armature 55. The stroke sensor 95 is connected to the control device 12.

The pressing mechanism 56 has a plurality of engagement portions 101 that are not movable in the axial direction relative to the second housing 32 (housing 23) and not rotatable relative to the second housing 32 (housing 23), and the cylindrical piston 102 having a plurality of levels of engaged portions that are engaged by the engagement portions 101 at different positions in the axial direction. As the armature 55 moves in the axial direction, the engagement portions 101 of the pressing mechanism 56 engage with the engaged portions of a different level located at a different position in the axial direction out of the plurality of levels.

Figure 4:
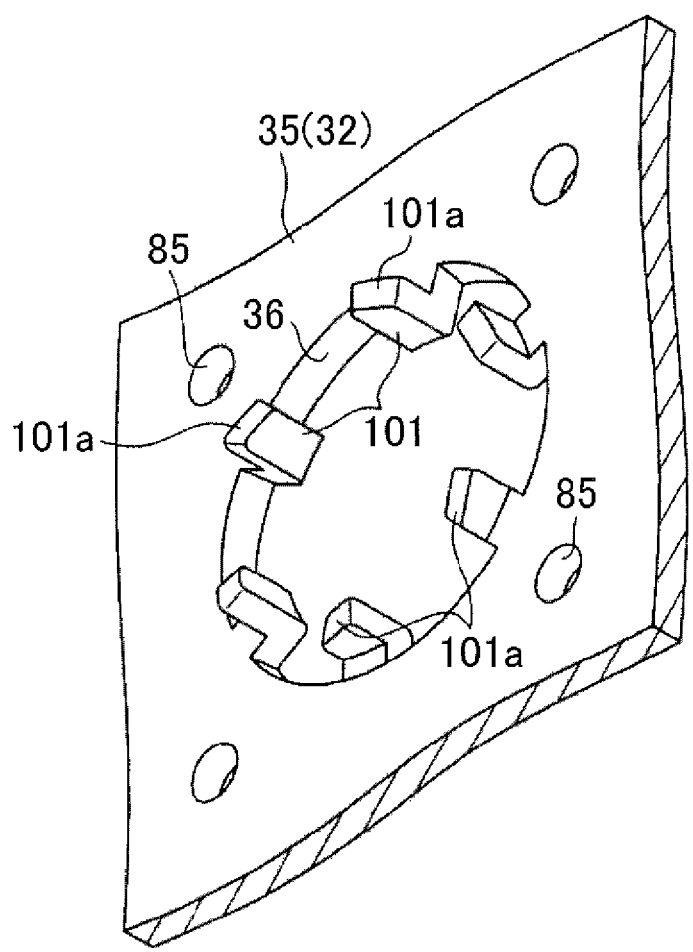
FIG. 4 is a perspective view showing a plurality of engagement portions provided in a second housing according to the first embodiment.

As shown in FIGS. 2 and 4, the engagement portions 101 are formed at regular angular intervals in the circumferential direction. Each of the engagement portions 101 has an L-shape protruding radially inward from the inner peripheral surface of the through hole 36 of the second housing 32 and then protruding toward the second direction side along the axis L. Distal end faces 101a of the engagement portions 101 face the axial end faces of the engaged portions of the piston 102 described below. Like the facing surfaces 93a of the pressing protrusions 93 of the armature 55, the distal end faces 101a are tilted surfaces tilted with respect to the direction parallel to the axis L.

Figure 5:
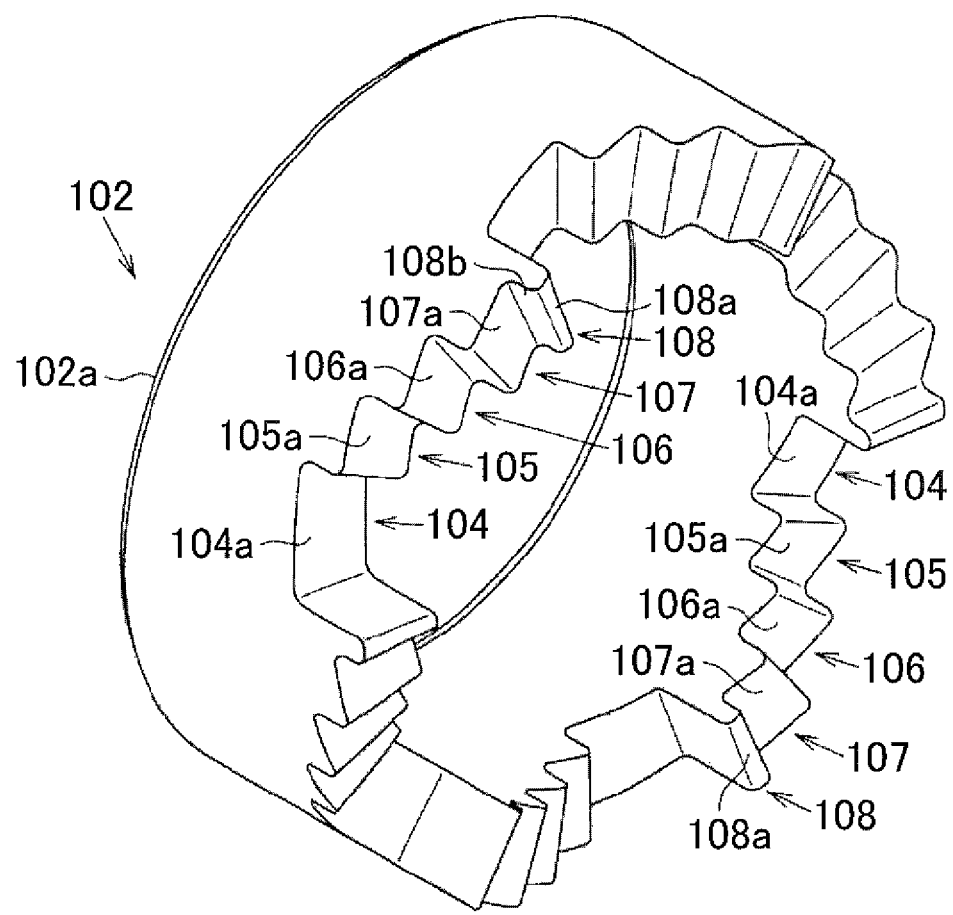
FIG. 5 is a perspective view of a piston according to the first embodiment.

As shown in FIGS. 2 and 5, the piston 102 has a cylindrical shape, and is disposed on the first direction side of the meshing member 51 and fitted on the outer periphery of the second rotary member 22. The piston 102 is clearance-fitted on the second rotary member 22 so as to be movable in the axial direction relative to the second rotary member 22 and to be rotatable relative to the second rotary member 22. A rolling bearing 103 such as a needle roller thrust bearing is disposed between the piston 102 and the meshing member 51. The piston 102 is thus biased toward the first direction side, namely toward the engagement portion 101 side, by the biasing member 52 via the meshing member 51 and the rolling bearing 103. A base end face 102a of the piston 102 on the second direction side, which contacts the rolling bearing 103, is in the form of a planar surface. When the armature 55 is pulled in by the electromagnetic coil 54 and moves in the axial direction, the piston 102 presses the meshing member 51 toward the second direction side, namely in such a direction that the first spline fitting portion 45 of the first rotary member 21 is disengaged from the second spline fitting portion 64 of the meshing member 51.

The plurality of levels of engaged portions that are engaged by the engagement portions 101 at different positions in the axial direction are formed on the first direction side end of the piston 102 so as to be adjoin each other in the circumferential direction. In the present embodiment, the piston 102 has four levels of engaged portions. Specifically, the plurality of levels of engaged portions are first to fourth engaged portions 104 to 107, and six sets of these engaged portions are formed along the circumferential direction.

The first to fourth engaged portions 104 to 107 are formed as follows. The second engaged portion 105 is formed on the right side of the first engaged portion 104 so as to adjoin the first engaged portion 104, the third engaged portion 106 is formed on the right side of the second engaged portion 105 so as to adjoin the second engaged portion 105, and the fourth engaged portion 107 is formed on the right side of the third engaged portion 106 so as to adjoin the third engaged portion 106, when the piston 102 is viewed from the first direction side. A wall 108 protruding in the axial direction is formed at the opposite circumferential end of the fourth engaged portion 107 from the third engaged portion 106.

The first to fourth engaged portions 104 to 107 are formed at different positions in the axial direction in the piston 102. Specifically, the second engaged portion 105 is located farther away from the base end face 102a than the first engaged portion 104 is. The third engaged portion 106 is located farther away from the base end face 102a than the second engaged portion 105 is. The fourth engaged portion 107 is located farther away from the base end face 102a than the third engaged portion 106 is.

Axial end faces 104a to 107a of the first to fourth engaged portions 104 to 107 are tilted with respect to the circumferential direction of the piston 102. Specifically, the axial end face 104a of the first engaged portion 104 is tilted so that its circumferential end which is located on the second engaged portion 105 side is located closer to the base end face 102a than the other circumferential end is. Similarly, the axial end face 105a of the second engaged portion 105 is tilted so that its circumferential end which is located on the third engaged portion 106 side is located closer to the base end face 102a than the other circumferential end is. The axial end face 106a of the third engaged portion 106 is tilted so that its circumferential end which is located on the fourth engaged portion 107 side is located closer to the base end face 102a than the other circumferential end is. The axial end face 107a of the fourth engaged portion 107 is tilted so that its circumferential end which is located on the wall 108 side is located closer to the base end face 102a than the other circumferential end is. An axial end face 108a of the wall 108 is tilted in the same direction as the axial end faces 104a to 107a of the first to fourth engaged portions 104 to 107. A circumferential side surface 108b of the wall 108 faces the fourth engaged portion 107.

The facing surfaces 93a of the pressing protrusions 93 of the armature 55 and the distal end faces 101a of the engagement portions 101 contact the axial end faces 104a to 107a of the first to fourth engaged portions 104 to 107. Specifically, the facing surfaces 93a of the pressing protrusions 93 of the armature 55 contact the radially outer parts of the axial end faces 104a to 107a, and the distal end faces 101a of the engagement portions 101 contact the radially inner parts of the axial end faces 104a to 107a.

The interval between the distal end face 101a of the engagement portion 101 and the base end face 102a of the piston 102 is the shortest when the engagement portion 101 engages with the first engaged portion 104. The meshing member 51 is thus moved toward the first direction side by the biasing force of the biasing member 52, and the first spline fitting portion 45 of the first rotary member 21 meshes with the second spline fitting portion 64 of the meshing member 51. Namely, the electromagnetic clutch 11 is engaged. The interval between the distal end face 101a of the engagement portion 101 and the base end face 102a of the piston 102 is the longest when the engagement portion 101 engages with the fourth engaged portion 107. The meshing member 51 is thus pressed by the piston 102 to move toward the second direction side, and the first spline fitting portion 45 is disengaged from the second spline fitting portion 64. Namely, the electromagnetic clutch 11 is disengaged. If the armature 55 is located at the second position where the armature 55 contacts the yoke 83 when the engagement portion 101 engages with the second engages with portion 105 or the third engaged portion 106, the first spline fitting portion 45 is disengaged from the second spline fitting portion 64. Namely, the electromagnetic clutch 11 is disengaged.

Operation of the pressing mechanism will be described.

FIGS. 6A to 6D are perspective views showing the armature 55 and the piston 102. Regarding the second housing 32, only the portion near the engagement portions 101 is shown in FIGS. 6A to 6D. FIGS. 7A to 7D are schematic views showing the piston 102 together with the pressing protrusion 93 of the armature 55 and the engagement portion 101 as viewed from outside in the radial direction.

Figure 6:
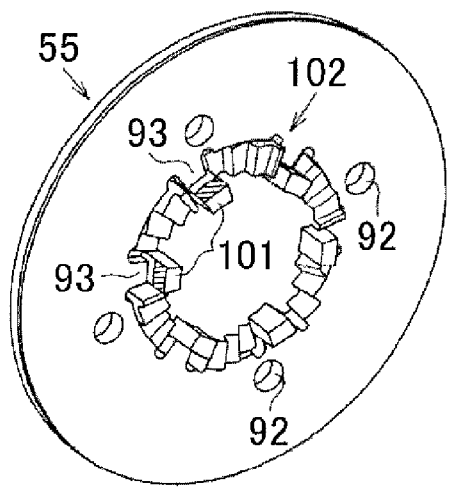
FIGS. 6A to 6D are perspective views of a pressing mechanism, showing a piston together with pressing protrusions of an armature and engagement portions according to the first embodiment.
Figure 6:
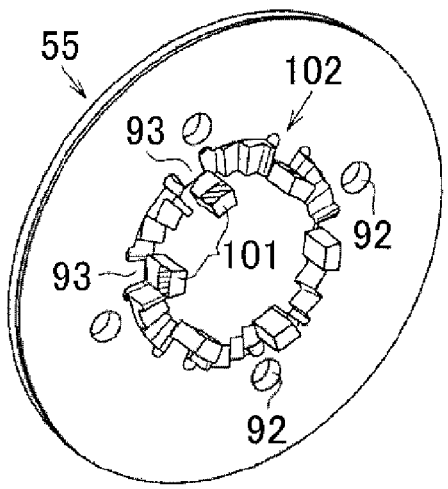
Figure 6:
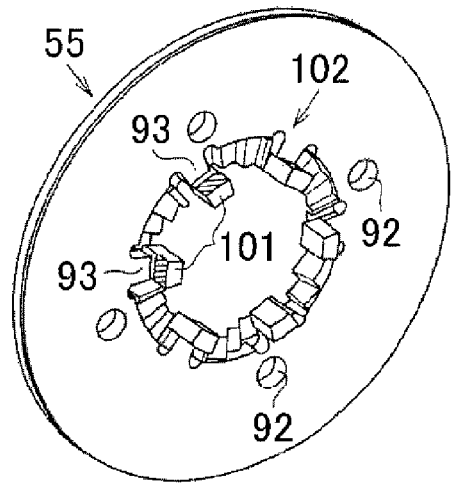
Figure 6:
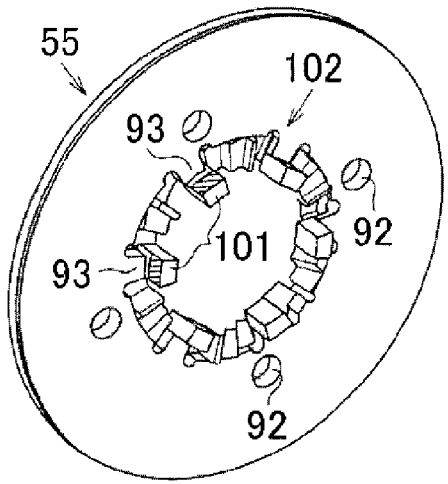
Figure 7A:
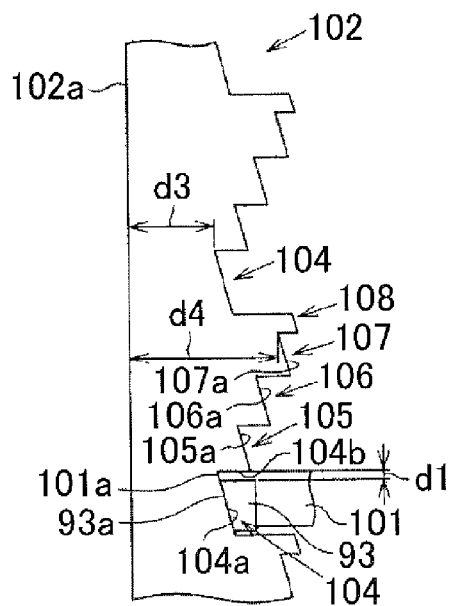
FIGS. 7A to 7D are schematic views of the piston, the pressing protrusion of the armature, and the engagement portion, illustrating operation of the pressing mechanism according to the first embodiment.

FIGS. 6A and 7A show a first state where the engagement portion 101 engages with the first engaged portion 104 and the armature 55 is located at the first position. In the first state, the axial end face 104a of the first engaged portion 104 is pressed against the distal end face 101a of the engagement portion 101 by the biasing force of the biasing member 52 and faces the facing surface 93a of the pressing protrusion 93 of the armature 55. The engagement portion 101 contacts a circumferential side surface 104b of the first engaged portion 104, and the pressing protrusion 93 of the armature 55 faces the axial end face 104a at a position separated in the circumferential direction of the piston 102 from the circumferential side surface 104b. The circumferential side surface 104b is a surface forming the difference in level between the first engaged portion 104 and the second engaged portion 105, and is a flat surface parallel to the axis L. In the first engaged portion 104, the angle between the axial end face 104a and the circumferential side surface 104b is an acute angle.

Figure 7B:
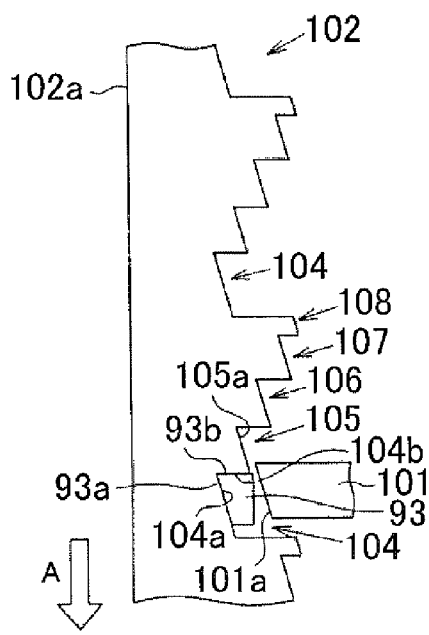

FIGS. 6B and 7B show a second state where the armature 55 has been moved from the first state shown in FIGS. 6A and 7A to the second position by power supply to the electromagnetic coil 54. During the transition from the first state to the second state, the facing surface 93a of the pressing protrusion 93 of the armature 55 contacts the axial end face 104a, and the pressing protrusion 93 presses the piston 102 toward the second direction side (the meshing member 51 side). In the second state, the engagement portion 101 is separated from the circumferential side surface 104b of the first engaged portion 104, and the piston 102 rotates in the direction of arrow A by a first predetermined angle due to sliding between the axial end face 104a of the first engaged portion 104 and the facing surface 93a of the pressing protrusion 93 of the armature 55. The circumferential side surface 104b of the first engaged portion 104 contacts a circumferential side surface 93b of the pressing protrusion 93 of the armature 55 due to the rotation of the piston 102.

That is, as the armature 55 moves from the first position to the second position, the armature 55 moves the piston 102 toward the second direction side (the meshing member 51 side) and rotates the piston 102 by the first predetermined angle. The first predetermined angle is an angle corresponding to the distance d1 between the pressing protrusion 93 of the armature 55 and the circumferential side surface 104b of the first engaged portion 104 as shown in FIG. 7A.

When the armature 55 is located at the second position, the distal end face 101a of the engagement portion 101 is located at a distance from the second engagement portion 105 and faces the axial end face 105a. That is, when the armature 55 moves to the second position, the piston 102 rotates by the first predetermined angle, so that the pressing protrusion 93 contacts the circumferential side surface 104b, and the distal end face 101a of the engagement portion 101 faces the axial end face 105a of the second engaged portion 105 adjoining the first engaged portion 104.

Figure 7C:
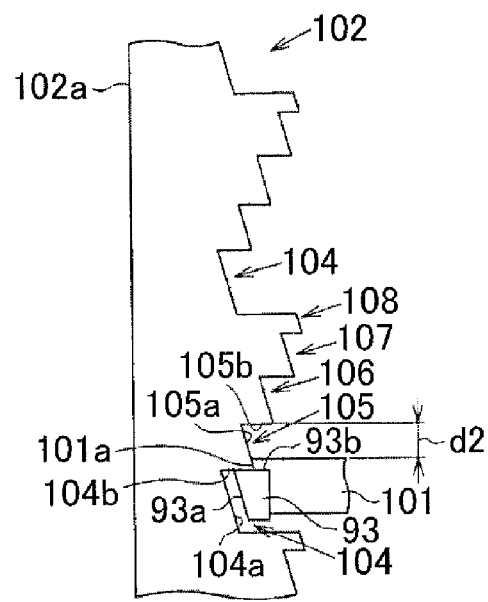

FIGS. 6C and 7C show a third state where power supply to the electromagnetic coil 54 has been stopped, and the armature 55 is returning from the second position to the first position. In the third state, the distal end face 101a of the engagement portion 101 contacts the axial end face 105a of the second engaged portion 105. Due to this contact between the distal end face 101a of the engagement portion 101 and the axial end face 105a of the second engaged portion 105, the piston 102 is subjected to a rotational force in the direction of arrow A. However, this rotation in the direction of arrow A is restricted by contact between the circumferential side surface 93b of the pressing protrusion 93 of the armature 55 and the circumferential side surface 104b of the first engaged portion 104.

Figure 7D:
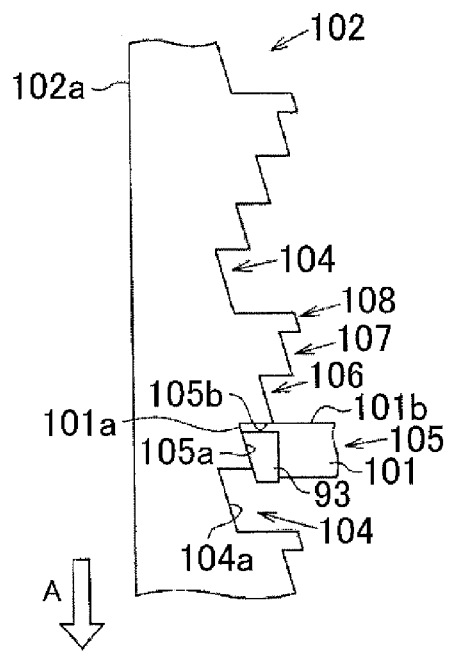

FIGS. 6D and 7D show a fourth state where the armature 55 has returned to the first position, and the piston 102 has rotated in the direction of arrow A until a circumferential side surface 105b of the second engaged portion 105 contacts a circumferential side surface 101b of the engagement portion 101. In the fourth state, the axial end face 105a of the second engaged portion 105 of the piston 102 subjected to the biasing force of the biasing member 52 slides on the distal end face 101a of the engagement portion 101, whereby the piston 102 rotates relative to the engagement portion 101 by a second predetermined angle. The engagement portion 101 thus engages with the second engaged portion 105. The second predetermined angle is an angle corresponding to the distance d2 between the circumferential side surface 105b of the second engaged portion 105 and the engagement portion 101 in the third state shown in FIG. 7C. That is, as the armature 55 moves from the second position to the first position, the piston 102 is further rotated by the second predetermined angle, and the engagement portion 101 engages with the second engaged portion 105 adjoining the first engaged portion 104.

As described above, the pressing mechanism 56 moves the meshing member 51 in the axial direction against the biasing force of the biasing member 52 as the armature 55 reciprocates between the first position and the second position. In the present embodiment, the piston 102 has the first to fourth engaged portions 104 to 107 that are formed as four steps. Accordingly, power supply to the electromagnetic coil 54 is conducted and stopped three times, and the armature 55 reciprocates three times between the first position and the second position, whereby the piston 102 rotates from the position where the engagement portion 101 engages with the first engaged portion 104 to the position where the engagement portion 101 engages with the fourth engaged portion 107. As shown in FIG. 7A, the distance d4 from the base end face 102a of the piston 102 to the axial end face 107a of the fourth engaged portion 107 is longer than the distance d3 from the base end face 102a of the piston 102 to the axial end face 104a of the first engaged portion 104. The piston 102 advances and withdraws in the axial direction in a range corresponding to the difference between the distance d4 and the distance d3.

FIGS. 8A to 8D are schematic views illustrating operation at the time the engagement portion 101 switches from the state where it engages with the fourth engaged portion 107 to the state where it engages with the first engaged portion 104, and the electromagnetic clutch 11 switches from the disengaged state to the engaged state.

Figure 8:
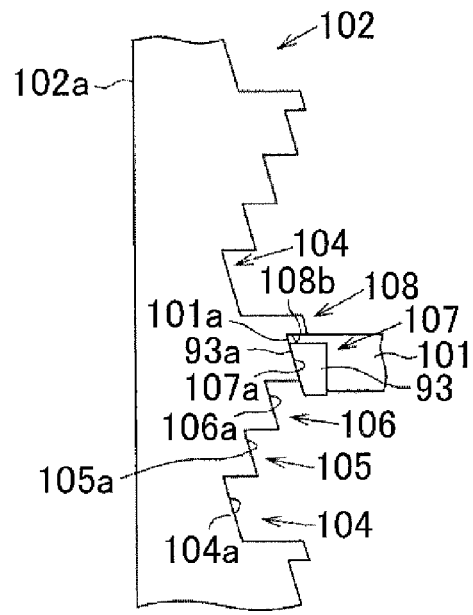
FIGS. 8A to 8D are schematic views of the piston, the pressing protrusion of the armature, and the engagement portion, illustrating operation of the pressing mechanism at the time the electromagnetic clutch switches from a disengaged state to an engaged state according to the first embodiment.
Figure 8:
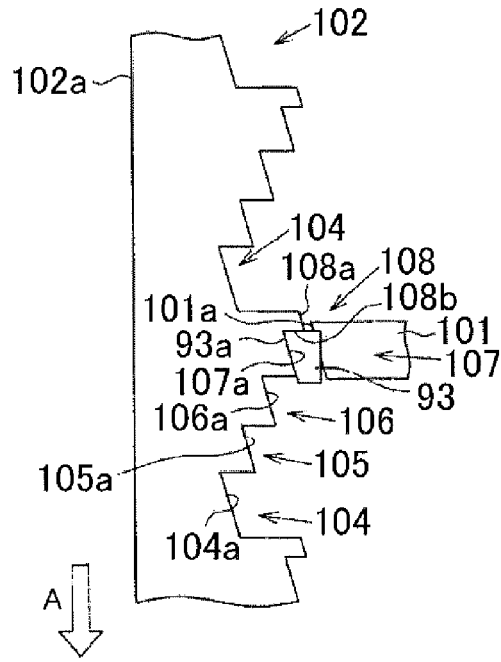
Figure 8:
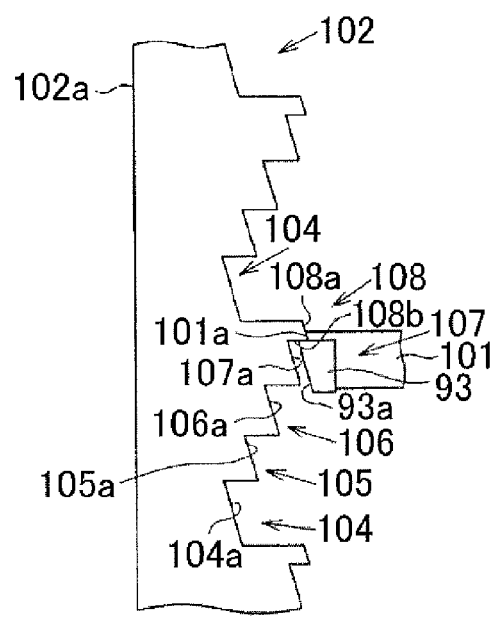
Figure 8:
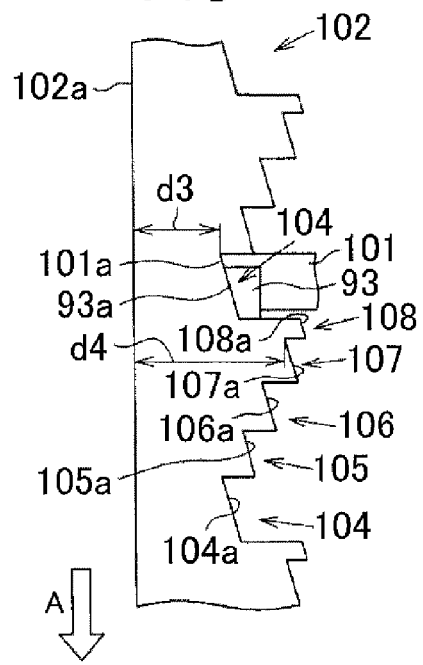

FIG. 8A shows a state where the engagement portion 101 engages with the fourth engaged portion 107, and the armature 55 is located at the first position. In this state, the engagement portion 101 contacts the axial end face 107a of the fourth engaged portion 107 and the circumferential side surface 108b of the wall 108.

FIG. 8B shows a state where the armature 55 has moved to the second position. During the transition from the first state to the second state, the pressing protrusion 93 presses the piston 102 toward the meshing member 51 side, and the engagement portion 101 is separated from the circumferential side surface 108b of the wall 108. The piston 102 therefore rotates in the direction of arrow A by the first predetermined angle.

FIG. 8C shows a state where the armature 55 is returning from the second position to the first position. In this state, the distal end face 101a of the engagement portion 101 contacts the axial end face 108a of the wall 108, and the piston 102 is subjected to a rotational force in the direction of arrow A.

FIG. 8D shows a state where the armature 55 has returned to the first position, and the engagement portion 101 has rotated in the direction of arrow A until it engages with the first engaged portion 104. During the transition from the state of FIG. 8C to the state of FIG. 8D, the piston 102 is shifted to a large extent in the axial direction in the entire range corresponding to the difference between the distance d3 and the distance d4, and the second spline fitting portion 64 of the meshing member 51 meshes with the first spline fitting portion 45 of the first rotary member 21.

When the piston 102 thus moves toward the first direction side (the opposite side from the meshing member 51) according to the axial movement of the armature 55, the second spline fitting portion 64 meshes with the first spline fitting portion 45 by the biasing force of the biasing member 52. More specifically, when the engagement portion 101 is separated from the fourth engaged portion 107 formed at the farthest position from the meshing member 51 out of the first to fourth engaged portions 104 to 107 and engages with the first engaged portion 104 formed at the closest position to the meshing member 51, the second spline fitting portion 64 of the meshing member 51 meshes with the first spline fitting portion 45 by the biasing force of the biasing member 52, and the first rotary member 21 is coupled to the second rotary member 22 so that torque can be transmitted therebetween. Namely, the electromagnetic clutch 11 is engaged.

That is, the armature 55 needs to reciprocate three times between the first position and the second position in order for the electromagnetic clutch 11 to switch from the engaged state to the disengaged state. However, the armature 55 needs only to reciprocate once between the first position and the second position in order for the electromagnetic clutch 11 to switch from the disengaged state to the engaged state.

Transition of the state of the electromagnetic clutch that is caused by the operation of the pressing mechanism will be described below.

Figure 9A:
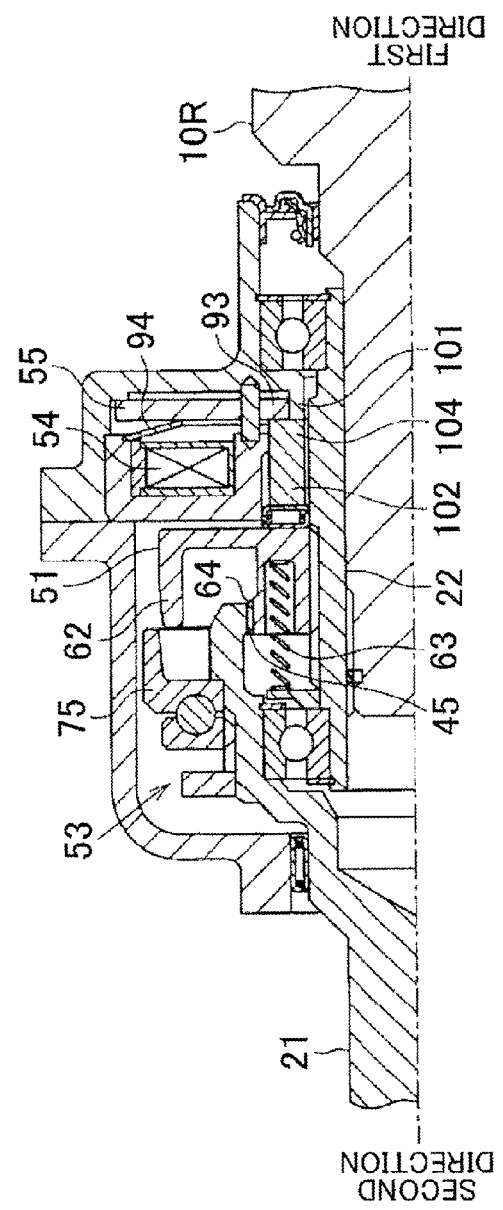
FIG. 9A is a sectional view illustrating operation of the electromagnetic clutch according to the first embodiment.
Figure 9B:
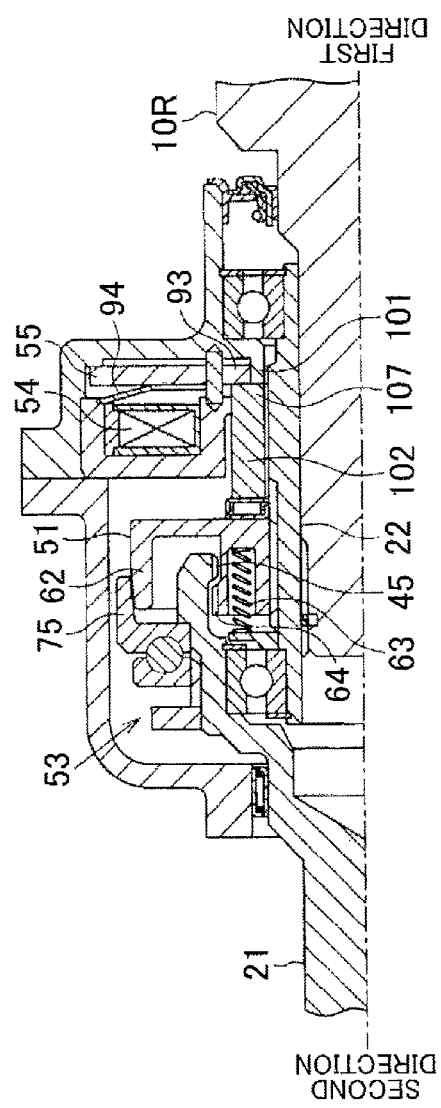
FIG. 9B is a sectional view illustrating operation of the electromagnetic clutch according to the first embodiment.

As shown in FIG. 9A, in the state where the engagement portion 101 engages with the first engaged portion 104, the first and second spline fitting portions 45, 64 mesh with each other. The electromagnetic clutch 11 is thus in the engaged state. In order to switch the electromagnetic clutch 11 from the engaged state to the disengaged state, current application to the electromagnetic coil 54 is controlled to reciprocate the armature 55 a plurality of times between the first position and the second position so that the engagement portion 101 engages with the fourth engaged portion 107. The meshing member 51 thus moves toward the second direction side in the axial direction against the biasing force of the biasing member 52, and the first and second spline fitting portions 45, 64 are disengaged from each other. The electromagnetic clutch 11 is thus switched to the disengaged state. As shown in FIG. 9B, in the state where the engagement portion 101 engages with the fourth engaged portion 107, the first and second spline fitting portions 45, 64 do not mesh with each other and the friction engagement portions 62, 75 do not frictionally engage with each other even if the armature 55 is moved to the first position by stopping power supply to the electromagnetic coil 54. The disengaged state of the electromagnetic clutch 11 is thus maintained.

Figure 9C:
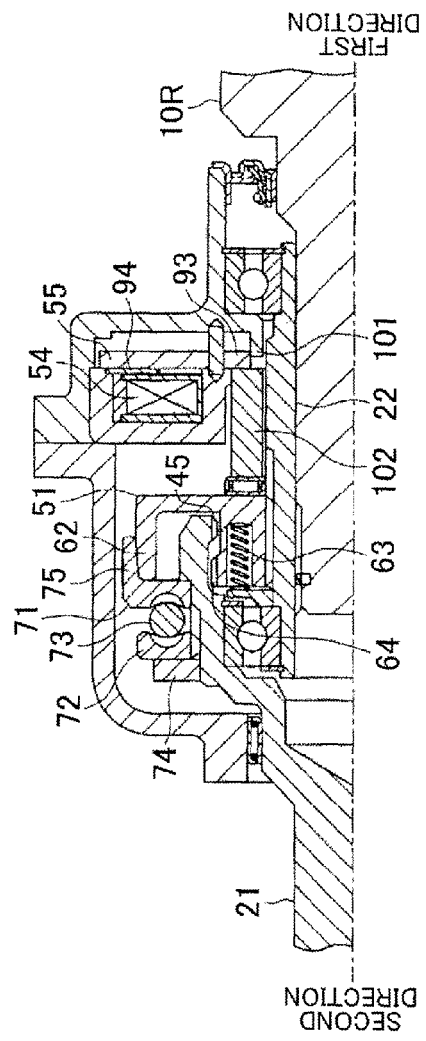
FIG. 9C is a sectional view illustrating operation of the electromagnetic clutch according to the first embodiment.

As shown in FIG. 9C, in order to switch the electromagnetic clutch 11 from the disengaged state to the engaged state, power is supplied to the electromagnetic coil 54 to move the armature 55 to the second position and to move the meshing member 51 toward the second direction side, thereby frictionally engaging the friction engagement portions 62, 75. After the first and second rotary members 21, 22 are synchronized with each other, power supply to the electromagnetic coil 54 is stopped to move the armature 55 to the first position so that the engagement portion 101 engages with the first engaged portion 104. The first and second spline fitting portions 45, 64 thus mesh with each other, and the electromagnetic clutch 11 is switched to the engaged state (see FIG. 9A).

The electrical configuration of the control device will be described below. Description of the configuration other than that associated with control of the electromagnetic clutch will be omitted for convenience.

Figure 10:
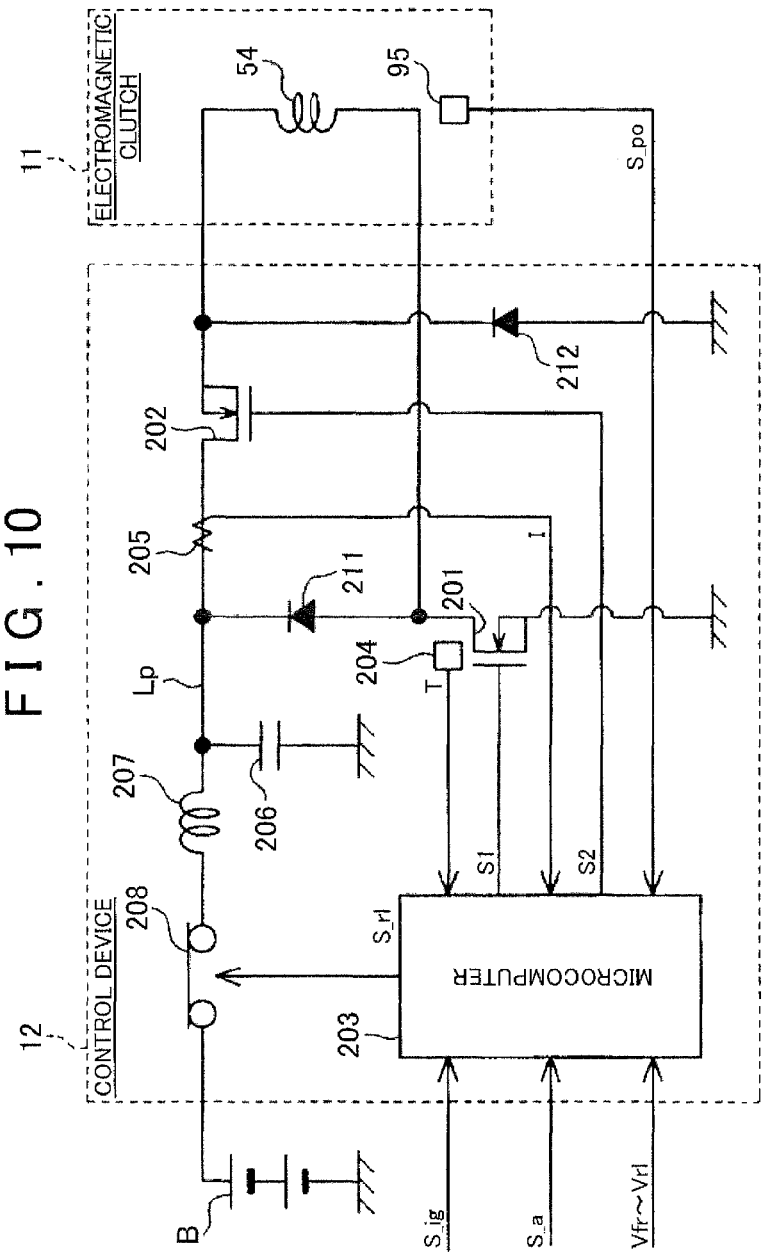
FIG. 10 is a block diagram of a control device that controls operation of the electromagnetic clutch according to the first embodiment.

As shown in FIG. 10, the control device 12 includes first and second switches 201, 202 and a microcomputer 203. The first and second switches 201, 202 control power supply from an in-vehicle power source B to the electromagnetic coil 54 of the electromagnetic clutch 11. The microcomputer 203 is a control circuit that outputs control signals S1, S2 for controlling the on/off state of the first and second switches 201, 202. For example, semiconductor switching elements that are turned on/off in response to a gate voltage such as metal oxide semiconductor field effect transistors (MOSFETs) or insulated gate bipolar transistors (IGBTs) are used as the first and second switches 201, 202 of the present embodiment. The control signals S1, S2 that are output from the microcomputer 203 are voltage signals that are applied to gate terminals of the first and second switches 201, 202.

The first switch 201 has its drain terminal connected to one end of the electromagnetic coil 54 and its source terminal connected to the ground. A temperature sensor 204 that detects the temperature (detected temperature T) of the first switch 201 is provided near the first switch 201.

The second switch 202 has its drain terminal connected to the in-vehicle power source B via a power supply line Lp and its source terminal connected to the other end of the electromagnetic coil 54. A current sensor 205 is provided on the power supply line Lp. The current sensor 205 detects a value of an actual current flowing in the electromagnetic coil 54 (actual current value I). A capacitor 206 and a coil 207 are connected to the power supply line Lp in order to smooth a current that is applied to the power supply line Lp. A drive relay 208 that is formed by a mechanical relay, a field effect transistor (FET), etc. is provided on the in-vehicle power source B side of the coil 207. The power supply line Lp is conductive when the drive relay 208 is on, and is not conductive when the drive relay 208 is off. When the power supply line Lp is conductive, power according to the voltage of the in-vehicle power source B can be supplied to the electromagnetic coil 54

The control device 12 further includes a first diode 211 and a second diode 212. The first diode 211 allows a current to flow from the one end of the electromagnetic coil 54 to the in-vehicle power source B side of the current sensor 205 in the power supply line Lp. The second diode 212 allows a current to flow from the ground as a reference potential point to the other end of the electromagnetic coil 54. Specifically, the first diode 211 has its anode terminal connected to the one end of the electromagnetic coil 54 and its cathode terminal connected between the current sensor 205 and the coil 207 in the power supply line Lp. The second diode 212 has its anode terminal connected to the ground and its cathode terminal connected to the other end of the electromagnetic coil 54.

An IG signal S_ig indicating the on/off state of an ignition switch (hereinafter referred to as the "IG") of the vehicle is input to the microcomputer 203. When the microcomputer 203 receives an IG signal S_ig indicating that the IG is on, the microcomputer 203 outputs a relay control signal S_rl that turns on the drive relay 208. When the microcomputer 203 receives an IG signal S_ig indicating that the IG is off, the microcomputer 203 outputs a relay control signal S_rl that turns off the drive relay 208. If the actual current value I is larger than a threshold current Ith, the microcomputer 203 outputs a relay control signal S_rl that turns off the drive relay 208. For example, the threshold current Ith is a current value indicating that a ground fault etc. of a wire between the control device 12 and the electromagnetic clutch 11 has occurred. The threshold current Ith is obtained in advance by experiments etc.

The stroke sensor 95 is connected to the microcomputer 203. The stroke sensor 95 detects the position of the armature 55 of the electromagnetic clutch 11, and the microcomputer 203 detects the position of the armature 55 based on a position signal S_po that is output from the stroke sensor 95. An initial position of the piston 102 is stored in advance in the microcomputer 203 of the present embodiment, and the microcomputer 203 determines if the electromagnetic clutch 11 is in the engaged state or in the disengaged state based on the initial position of the piston 102 and the number of times the armature 55 reciprocates between the first and second positions.

In addition to the temperature sensor 204 and the current sensor 205, the accelerator operation amount sensor 13 and the wheel speed sensors 14a to 14d are connected to the microcomputer 203. The detected temperature T of the first switch 201, the actual current value I flowing in the electromagnetic coil 54, the accelerator operation amount signal S_a, and the wheel speeds Vfr, Vfl, Vrr, Vrl are input to the microcomputer 203. Based on these received state quantities, the microcomputer 203 outputs the control signals S1, S2 to the first and second switches 201, 202 to control power supply to the electromagnetic coil 54. At this time, in the case of switching the vehicle 1 into the two-wheel drive mode, the microcomputer 203 controls power supply to the electromagnetic coil 54 so as to bring the electromagnetic clutch 11 into the disengaged state. In the case of switching the vehicle 1 into the four-wheel drive mode, the microcomputer 203 controls power supply to the electromagnetic coil 54 so as to bring the electromagnetic clutch 11 into the engaged state.

The microcomputer 203 repeatedly conducts and stops power supply to the electromagnetic coil 54 based on the position signal S_po. The microcomputer 203 thus operates the pressing mechanism 56 to bring the electromagnetic clutch 11 into the engaged state or the disengaged state. Specifically, the microcomputer 203 supplies power to the electromagnetic coil 54 until the armature 55 moves from the first position where the armature 55 contacts the bottom 35 of the second housing 32 to the second position where the armature 55 contacts the yoke 83. The microcomputer 203 stops power supply to the electromagnetic coil 54 when the armature 55 reaches the second position, and resumes power supply to the electromagnetic coil 54 if the armature 55 reaches the first position. The microcomputer 203 repeats this operation to operate the pressing mechanism 56. By operating the pressing mechanism 56, the microcomputer 203 continues to stop power supply with the engagement portion 101 engaging with the first engaged portion 104 in the case of bringing the electromagnetic clutch 11 into the engaged state, and continues to stop power supply with the engagement portion 101 engaging with the fourth engaged portion 107 in the case of bringing the electromagnetic clutch 11 into the disengaged state.

If the detected temperature T is equal to or lower than a preset threshold temperature Tth when power is supplied to the electromagnetic coil 54, the microcomputer 203 of the present embodiment applies a pulse-width modulation (PWM)-controlled control signal S1 to the first switch 201 and applies a control signal S2 held at Hi level to the second switch 202 to supply power to the electromagnetic coil 54. That is, if the detected temperature T is equal to or lower than the threshold temperature Tth, the microcomputer 203 drives the first switch 201 by PWM and holds the second switch 202 in the on state to supply power to the electromagnetic coil 54.

If the detected temperature T is higher than the threshold temperature Tth when power is supplied to the electromagnetic coil 54, the microcomputer 203 applies a control signal S1 held at Hi level to the first switch 201 and applies a PWM-controlled control signal S2 to the second switch 202 to supply power to the electromagnetic coil 54. That is, if the detected temperature T is higher than the threshold temperature Tth, the microcomputer 203 holds the first switch 201 in the on state and drives the second switch 202 by PWM to supply power to the electromagnetic coil 54. The duty ratios of the control signals S1, S2 are computed by performing current feedback control so that the actual current value I follows a target current value.

When stopping power supply to the electromagnetic coil 54, the microcomputer 203 holds the control signals S1, S2 at Lo level (stops outputting the control signals S1, S2) and turns off both the first and second switches 201, 202 to stop power supply to the electromagnetic coil 54.

Control procedures for the electromagnetic clutch by the microcomputer will be described below.

Figure 11:
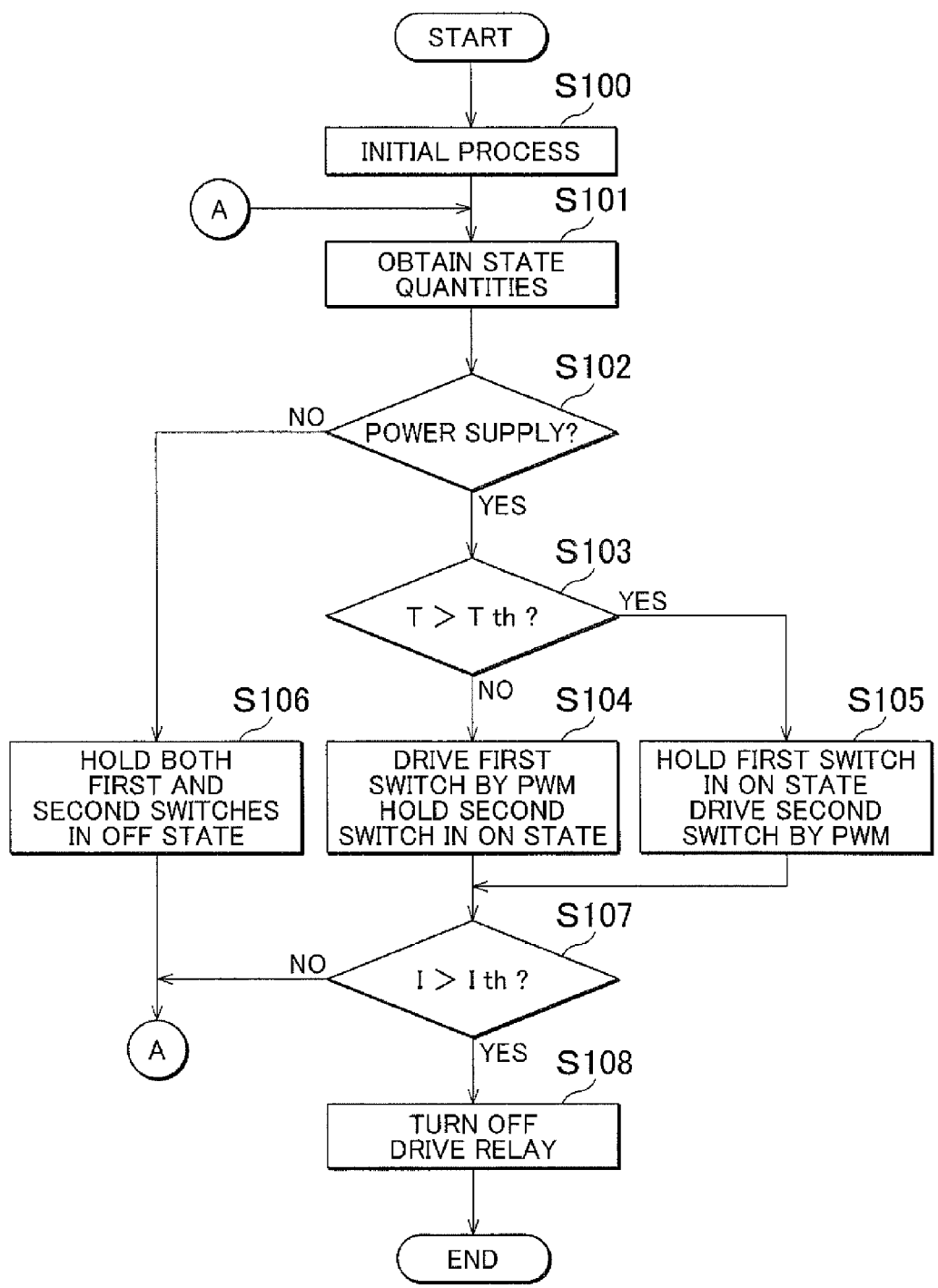
FIG. 11 is a flowchart illustrating control procedures for the electromagnetic clutch that is conducted by the control device according to the first embodiment.

As shown in the flowchart of FIG. 11, the microcomputer 203 performs an initial process such as turning on the drive relay in response to an IG signal S_ig indicating that the IG is on (step S100). The microcomputer 203 then obtains state quantities (step S101) and determines whether to conduct or stop power supply to the electromagnetic coil 54 based on the state quantities (step S102).

If it is determined that power should be supplied to the electromagnetic coil 54 (step S102: YES), the microcomputer 203 determines if the detected temperature T of the first switch 201 is higher than the threshold temperature Tth (step S103). If the detected temperature T is equal to or lower than the threshold temperature Tth (step S103: NO), the microcomputer 203 drives the first switch 201 by PWM and holds the second switch 202 in the on state to supply power to the electromagnetic coil 54 (step S104), and the routine proceeds to step S107 described below. If the detected temperature T is higher than the threshold temperature Tth (step S103: YES), the microcomputer 203 holds the first switch 201 in the on state and drives the second switch 202 by PWM to supply power to the electromagnetic coil 54 (step S105), and the routine proceeds to step S107.

In the case of stopping power supply to the electromagnetic coil 54 based on the state quantities obtained in step S101 (step S102: NO), the microcomputer 203 turns off both the first and second switches 201, 202 (step S106), and the routine proceeds to step S101.

In step S107, the microcomputer 203 determines if the actual current value I is larger than the threshold current Ith. If the actual current value I is equal to or smaller than the threshold current Ith (step S107: NO), the microcomputer 203 continues to supply power to the electromagnetic coil 54, and the routine proceeds to step S101. If the actual current value I is larger than the threshold current Ith (step S107: YES), the microcomputer 203 outputs a relay control signal S_rl that turns off the drive relay 208 (step S108), and thus stops the electromagnetic clutch 11 until the IG is turned on again after being turned off.

Functions of the present embodiment will be described.

In the case where the first switch 201 is driven by PWM and the second switch 202 is held in the on state when power is supplied to the electromagnetic coil 54, the first switch 201 is repeatedly turned on and off in a very short time. The first switch 201 therefore tends to overheat due to large switching loss. A major factor in heat generation of the second switch 202 is saturation loss according to the on-resistance of the second switch 202. Accordingly, the second switch 202 generates less heat than in the case where the second switch 202 is driven by PWM, and the temperature of the second switch 202 is less likely to increase to a predetermined temperature according to the ambient temperature, or higher. Similarly, in the case where the first switch 201 is held in the on state and the second switch 202 is driven by PWM when power is supplied to the electromagnetic coil 54, the temperature of the first switch 201 is less likely to increase to the predetermined temperature or higher, and the second switch 202 tends to overheat. According to the present embodiment, if the detected temperature T of the first switch 201 becomes higher than the threshold temperature Tth, the second switch 202 instead of the first switch 201 is driven by PWM, and the first switch 201 is held in the on state. The first switch 201 is therefore cooled by natural heat dissipation etc., and overheating of the first switch 201 is suppressed.

The moment power supply to the electromagnetic coil 54 is stopped, a back electromotive force is generated in the electromagnetic coil 54 due to electromagnetic induction. At this time, in the present embodiment, the first and second switches 201, 202 are off. The back electromotive force generated in the electromagnetic coil 54 is therefore consumed as a current flows from the second diode 212 to the in-vehicle power source B through the electromagnetic coil 54, the first diode 211, the coil 207, and the drive relay 208. That is, the back electromotive force of the electromagnetic coil 54 is consumed by regeneration by the in-vehicle power source B. Accordingly, a current flowing in the electromagnetic coil 54 quickly becomes zero as compared to the case where the back electromotive force of the electromagnetic coil 54 is consumed by, e.g., conversion to heat using a load such as a resistor.

If the actual current value I is larger than the threshold current Ith and it is estimated that a ground fault has occurred, the drive relay 208 is turned off. This suppresses an overcurrent in the second switch 202 etc.

Advantageous effects of the present embodiment will be described below.

(1) The back electromotive force that is generated at the moment when power supply to the electromagnetic coil 54 is stopped is consumed by regeneration by the in-vehicle power source B. Accordingly, a current flowing in the electromagnetic coil 54 can quickly become zero, and responsiveness of the electromagnetic clutch 11 can be improved. Moreover, heat generation of the control device 12 can be suppressed as compared to the case where the back electromotive force is consumed by conversion to heat using a resistor.

(2) The electromagnetic clutch 11 is switched between the engaged state and the disengaged state by reciprocating the armature 55 a plurality of times in the axial direction by the presence and absence of the pull-in force that is generated by the electromagnetic coil 54. This configuration is very effective in quickly consuming the back electromotive force generated in the electromagnetic coil 54 by regeneration by the in-vehicle power source B.

(3) If the detected temperature T of the first switch 201 becomes higher than the threshold temperature Tth, the second switch 202 is driven by PWM instead of the first switch 201. This can suppress overheating of the first switch 201.

A second embodiment will be described below with reference to the drawings. For convenience of description, the same configurations as those of the first embodiment will be denoted with the same reference characters, and description thereof will be omitted.

Figure 12:
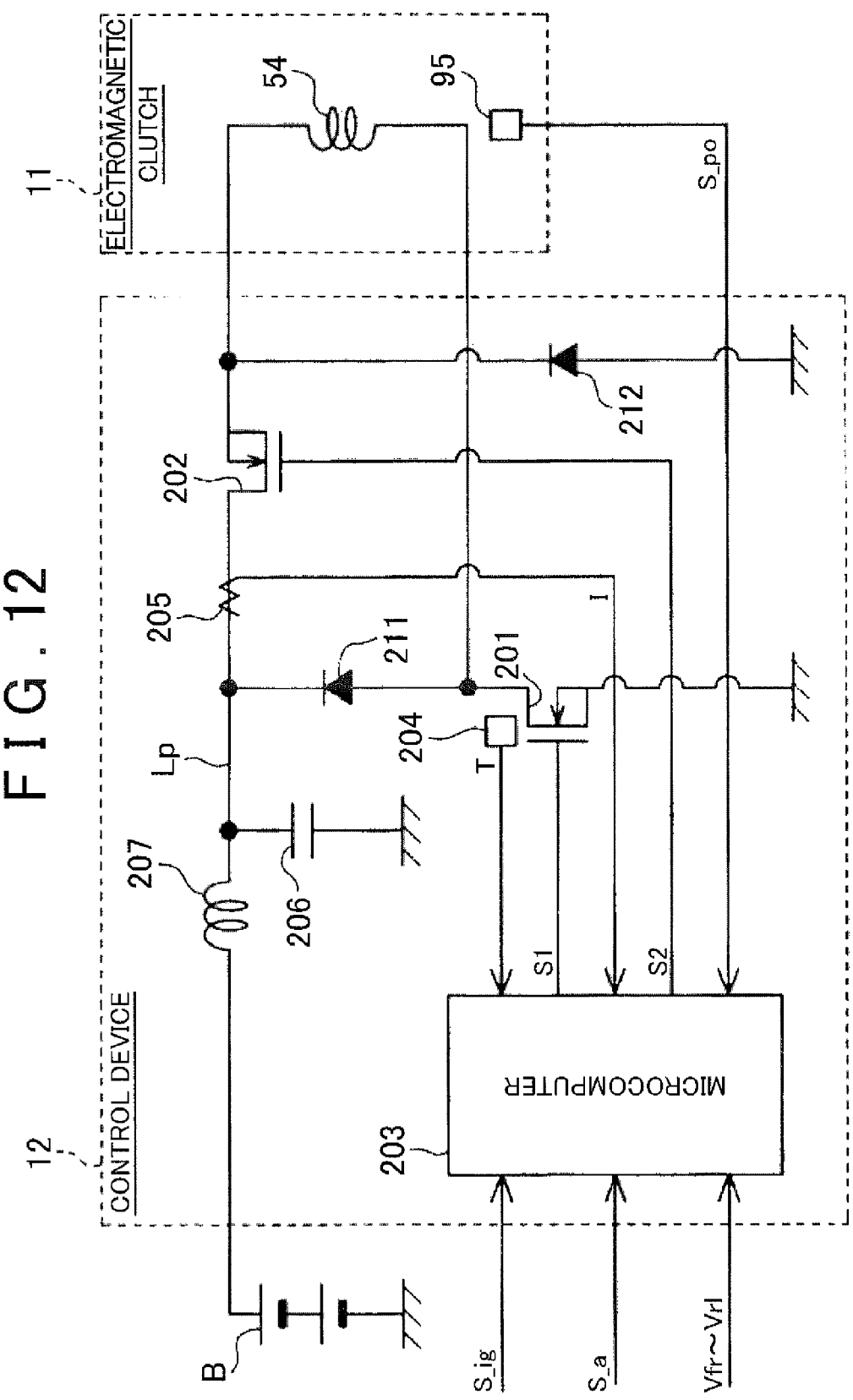
FIG. 12 is a block diagram of a control device that controls operation of an electromagnetic clutch according to a second embodiment.

As shown in FIG. 12, the control device 12 does not include the drive relay 208, and the coil 207 is connected to a high potential-side terminal of the in-vehicle power source B without interposing a switch such as a relay therebetween. If the actual current value I is larger than the threshold current Ith, the microcomputer 203 holds the control signals S1, S2 at Lo level (stops outputting the control signals S1, S2) to hold the first and second switches 201, 202 in the off state.

Control procedures of the microcomputer after power supply to the electromagnetic coil will be described below.

Figure 13:
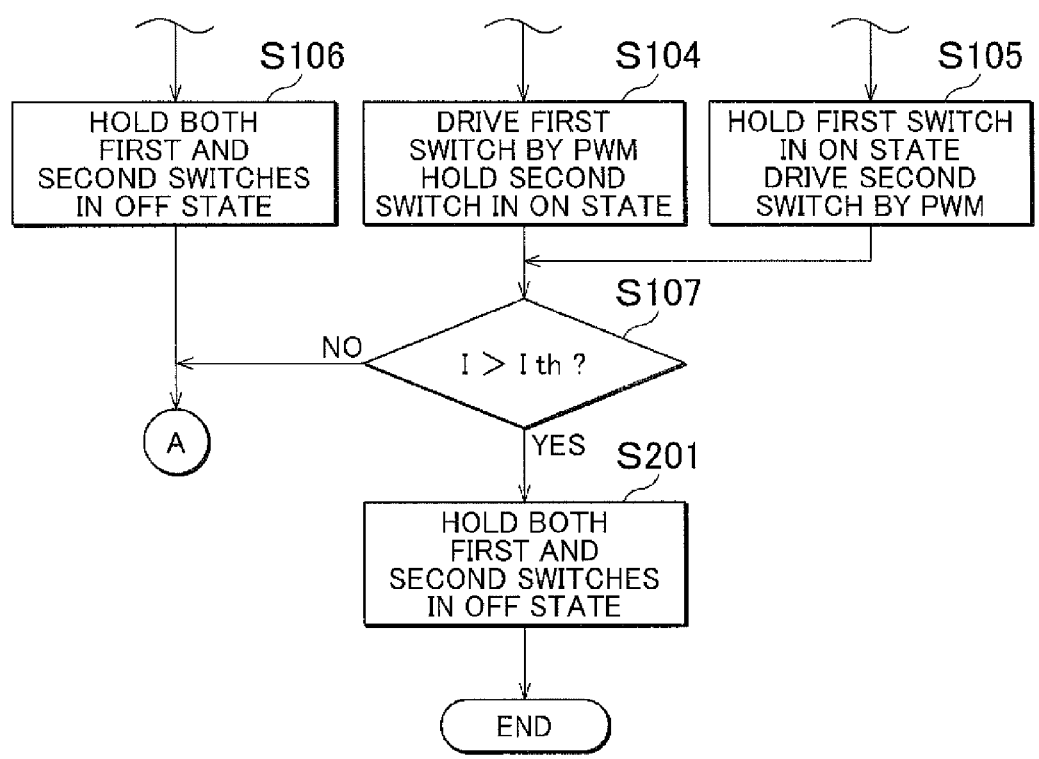
FIG. 13 is a flowchart illustrating control procedures for the electromagnetic clutch that is conducted by the control device according to the second embodiment.

As shown in the flowchart of FIG. 13, if the actual current value I is equal to or smaller than the threshold current Ith (step S107: NO), the microcomputer 203 continues to supply power to the electromagnetic coil 54, and the routine proceeds to step S101, as in the first embodiment. If the actual current value I is larger than the threshold current Ith (step S107: YES), the microcomputer 203 holds both the first and second switches 201, 202 in the off state (step S201) to stop the electromagnetic clutch 11 until the IG is turned on again after being turned off.

In the control device 12 with the above configuration, the first and second switches 201, 202 are held in the off state if the actual current value I is larger than the threshold current Ith and it is estimated that a ground fault has occurred. This suppresses an overcurrent in the second switch 202 etc.

Advantageous effects of the present embodiment will be described below. The present embodiment has the following advantageous effect in addition to the above advantageous effects (1) to (3) of the first embodiment.

(4) If the actual current value I is larger than the threshold current Ith, the microcomputer 203 holds the first and second switches 201, 202 in the off state, which suppresses an overcurrent in the second switch 202 etc. That is, the second switch 202 functions also as a relay that cuts off power supply to the electromagnetic coil 54. Accordingly, the drive relay 208 can be eliminated, and the control device 12 can be reduced in size.

The above embodiments can be modified as appropriate and carried out in the following forms.

In the second embodiment, if the actual current value I is larger than the threshold current Ith, both the first and second switches 201, 202 are held in the off state. However, only the second switch 202 may be held in the off state.

In the above embodiments, in the case of supplying power to the electromagnetic coil 54, an overcurrent is suppressed based on comparison between the actual current value I and the threshold current Ith regardless of which of the first and second switches 201, 202 is driven by PWM. However, the invention is not limited to this. For example, the comparison between the actual current value I and the threshold current Ith may be made only in the case of supplying power to the electromagnetic coil 54 by driving the first switch 201 by PWM and holding the second switch 202 in the on state.

In the above embodiments, if the actual current value I is larger than the threshold current Ith, the electromagnetic clutch 11 is stopped until the IG is turned on after being turned off. However, the invention is not limited to this. For example, whether a ground fault of a wire between the control device 12 and the electromagnetic clutch 11 has been continuing or not may be detected, and the electromagnetic clutch 11 may be driven again if the ground fault of the wire is no longer present.

In the above embodiments, the microcomputer 203 may not compare the actual current value I with the threshold current Ith.

In the above embodiments, the first and second spline fitting portions 45, 64 are formed as the first and second meshing portions in the first and second rotary members 21, 22. However, the invention is not limited to this. For example, crown gear-shaped teeth portions in which radially protruding teeth are arranged side by side in the circumferential direction may be formed as the first and second meshing members in the first and second rotary members 21, 22.

In the above embodiments, the engagement portions 101 are integral with the second housing 32. However, the invention is not limited to this. The engagement portions 101 may be separate members from the second housing 32.

In the above embodiments, in the state where the armature 55 is located at the second position (the state where a current is being applied to the electromagnetic coil 54), the armature 55 may not contact the yoke 83, and clearance may be present between the armature 55 and the yoke 83.

In the above embodiments, the first cam member 71 forming the cam mechanism 53 has the friction engagement portion 75. However, the invention is not limited to this. The electromagnetic clutch 11 may not be provided with the cam mechanism 53. For example, an engagement member having the same shape as the first cam member may be fixed to the first rotary member 21.

In the above embodiments, the temperature of the first switch 201 may not be detected. A temperature sensor that detects the temperature of the second switch 202 may be provided, and the switch to be driven by PWM and the switch to be held in the on state may be switched based on comparison between the detected temperature that is detected by the temperature sensor and the threshold temperature Tth.

The temperature sensor 204 may not be provided. In this case, when supplying power to the electromagnetic coil 54, one of the first and second switches 201, 202 is always driven by PWM, and the other switch is always held in the on state.

In the above embodiments, when operating the pressing mechanism 56, power supply to the electromagnetic coil 54 is conducted and stopped based on the position of the armature 55 which is detected by the stroke sensor 95. However, the invention is not limited to this. For example, power supply to the electromagnetic coil 54 may be conducted and stopped by estimating a first predetermined time after power supply to the electromagnetic coil 54 is started that the armature 55 has moved from the first position to the second position, and estimating a second predetermined time after power supply to the electromagnetic coil 54 is stopped that the armature 55 has moved from the second position to the first position.

In the above embodiments, the stroke sensor 95 detects the position of the armature 55, and the microcomputer 203 estimates the position of the piston 102 based on the initial position of the piston 102 and the number of times the armature 55 has reciprocated between the first and second positions, thereby determining whether the electromagnetic clutch 11 is in the engaged state or in the disengaged state. However, the invention is not limited to this. For example, a stroke sensor that detects the position of the piston 102 may be provided, and the position of the piston 102 may be detected based on a position signal from the stroke sensor to determine whether the electromagnetic clutch 11 is in the engaged state or in the disengaged state.

In the above embodiments, the anode terminal of the second diode 212 is connected to the ground as the reference potential point. However, the invention is not limited to this. For example, the reference potential point may be a low potential-side terminal of the in-vehicle power supply B, and the anode terminal of the second diode 212 may be connected to the low potential-side terminal.

In the above embodiments, semiconductor switching elements are used as the first and second switches 201, 202. However, the invention is not limited to this, and mechanical switches etc. may be used as the first and second switches 201, 202.

In the above embodiments, the control device 12 may conduct and stop power supply to an electromagnetic coil of any other clutch such as the torque coupling 7 in a control manner similar to that for the electromagnetic coil 54 of the electromagnetic clutch 11.

What is claimed is:

1. A control device for an electromagnetic clutch that permits and cuts off torque transmission between a first rotary member and a second rotary member, comprising:
    a first switch that is connected to one end of an electromagnetic coil forming the electromagnetic clutch;
    a second switch that is connected to the other end of the electromagnetic coil;
    a first diode that allows a first current to flow from the one end of the electromagnetic coil to a power supply line connecting the second switch and a power source;
    a second diode that allows a second current to flow from a reference potential point to the other end of the electromagnetic coil; and
    a control circuit that controls an on/off state of the first and second switches; wherein
    the control circuit stops power supply to the electromagnetic coil by turning off both the first and second switches.

2. The control device according to claim 1, further comprising:
    a temperature sensor that detects a temperature of one of the first and second switches; wherein
    each of the first and second switches is a semiconductor switching element that is switched between the on state and the off state in response to a gate voltage,
    if a detected temperature that is detected by the temperature sensor is equal to or lower than a threshold temperature, the control circuit supplies power to the electromagnetic coil by driving one of the first and second switches by pulse width modulation and holding the other switch in the on state, and
    if the detected temperature is higher than the threshold temperature, the control circuit supplies power to the electromagnetic coil by holding one of the first and second switches in the on state and driving the other switch by the pulse width modulation.

3. The control device according to claim 1, further comprising:
    a current sensor that detects a value of an actual current flowing in the electromagnetic coil; wherein
    if the value of the actual current that is detected by the current sensor is larger than a threshold current, the control circuit holds the second switch in the off state.

4. The control device according to claim 2, further comprising:
    a current sensor that detects a value of an actual current flowing in the electromagnetic coil; wherein
    if the value of the actual current that is detected by the current sensor is larger than a threshold current, the control circuit holds the second switch in the off state.

* * * * *